(12) United States Patent
Mandler

(10) Patent No.: US 9,164,294 B2
(45) Date of Patent: Oct. 20, 2015

(54) METHOD FOR THE MANUFACTURE OF COST-OPTIMIZED SPECTACLE LENSES

(75) Inventor: Roland Mandler, Heuchelheim (DE)

(73) Assignee: OPTOTECH OPTIKMASCHINEN GMBH, Wettenberg (DE)

( * ) Notice: Subject to any disclaimer, the term of this patent is extended or adjusted under 35 U.S.C. 154(b) by 907 days.

(21) Appl. No.: 13/312,263

(22) Filed: Dec. 6, 2011

(65) Prior Publication Data

US 2012/0140169 A1 Jun. 7, 2012

(30) Foreign Application Priority Data

Dec. 6, 2010 (DE) .......................... 10 2010 061 056

(51) Int. Cl.
| | |
|---|---|
| *B24B 49/02* | (2006.01) |
| *B24B 13/06* | (2006.01) |
| *B24B 9/14* | (2006.01) |
| *G02C 7/02* | (2006.01) |
| *B29D 11/00* | (2006.01) |

(52) U.S. Cl.
CPC ...... *G02C 7/02* (2013.01); *B24B 9/14* (2013.01); *B24B 13/06* (2013.01); *B24B 49/02* (2013.01); *B29D 11/00019* (2013.01)

(58) Field of Classification Search
CPC .......... B24B 9/14; B24B 9/148; B24B 13/00; B24B 13/0006; B24B 13/0012; B24B 13/0018; B24B 13/023; B24B 13/06; B24B 49/00; B24B 49/02; B29D 11/00019; B29D 11/00028
USPC .............................. 451/5, 41, 42, 43, 255, 256
See application file for complete search history.

(56) References Cited

U.S. PATENT DOCUMENTS

| | | | |
|---|---|---|---|
| 1,482,951 A | 2/1924 | Stead | |
| 3,339,997 A * | 9/1967 | Wesley | .................... 351/159.41 |

(Continued)

FOREIGN PATENT DOCUMENTS

| | | |
|---|---|---|
| DE | 3433916 A1 | 3/1986 |
| DE | 19701312 A1 | 7/1998 |

(Continued)

OTHER PUBLICATIONS

European Search Report for Application No. 11190291.2 issued Mar. 23, 2012.

(Continued)

*Primary Examiner* — Eileen Morgan
(74) *Attorney, Agent, or Firm* — Marshall, Gerstein & Borun LLP

(57) ABSTRACT

A method for manufacture of spectacle glasses from prefabricated blanks made without cutting. Each prefabricated blank has a front side not to be finished and an opposite back side. The front side and the back side have at least one optical focus in common. The method includes finishing the back side by calculating a prescription surface based on a prescription of a person. The prescription describes the vision defects of a left and a right eye of the person. The machined back side and the front side together form a first prescription lens and a second prescription lens. The method further includes making first and second spectacle glasses from the first and second prescription lenses. Focal points of the first spectacle glass correct the vision defect of the left eye and focal points of the second spectacle glass correct the vision defect of the right eye of the person.

13 Claims, 3 Drawing Sheets

(56) References Cited

U.S. PATENT DOCUMENTS

| | | | |
|---|---|---|---|
| 4,561,736 A * | 12/1985 | Furter et al. | 251/159 |
| 4,906,090 A | 3/1990 | Barth | |
| 5,210,695 A * | 5/1993 | Wood | 700/164 |
| 5,341,604 A * | 8/1994 | Wood | 451/5 |
| 5,550,599 A * | 8/1996 | Jannard | 351/159.02 |
| 7,011,409 B2 * | 3/2006 | Nishikata | 351/159.75 |
| 7,204,589 B2 * | 4/2007 | Pieterman | 351/47 |
| 7,267,436 B2 * | 9/2007 | Ito et al. | 351/159.75 |
| 7,582,235 B2 * | 9/2009 | Evans et al. | 264/1.32 |
| 8,814,349 B2 * | 8/2014 | Goebel Quintana | 351/159.01 |
| 2004/0017610 A1 * | 1/2004 | Evans et al. | 359/490 |
| 2005/0046792 A1 * | 3/2005 | Ito et al. | 351/177 |
| 2005/0146677 A1 * | 7/2005 | Nishikata | 351/159 |
| 2006/0055929 A1 * | 3/2006 | Shanbaum | 356/401 |
| 2007/0277357 A1 * | 12/2007 | Meyer et al. | 29/27 C |

FOREIGN PATENT DOCUMENTS

| | | |
|---|---|---|
| DE | 10103113 A1 | 8/2002 |
| EP | 0 744 646 A1 | 11/1996 |
| GB | 10129 | 0/1913 |
| GB | 689997 A | 4/1953 |
| JP | 06-002846 Y2 | 1/1994 |
| JP | 3 008949 U | 3/1995 |
| WO | WO-94/20878 A1 | 9/1994 |
| WO | WO-99/52480 A1 | 10/1999 |

OTHER PUBLICATIONS

German Office action for Application No. 10 2010 061 056.9 dated Jun. 16, 2011.

* cited by examiner

METHOD FOR THE MANUFACTURE OF COST-OPTIMIZED SPECTACLE LENSES

CROSS-REFERENCE TO RELATED APPLICATIONS

The priority benefit of German Patent Application No. 10 2010 061056.9, filed Dec. 6, 2010, is hereby claimed and the entire contents thereof are incorporated herein by reference.

FIELD OF THE DISCLOSURE

The disclosure concerns a method for manufacture of spectacle glasses from prefabricated blanks made without cutting consisting preferably of plastic or silicate glass, with a front side no to be finished and an opposite back side to be finished by a CNC machine, having at least one optical focus in common.

BACKGROUND

Spectacle glasses serve as a vision aid and are available in diverse forms. Two spectacle glasses are usually connected by a frame and form, together with this, a pair of spectacles. This can be positioned in front of two eyes so that one spectacle glass is arranged in front of each eye.

The function of a spectacle glass is based on the physical properties of an optical lens. The prerequisite is an optically transparent material. A front and a rear side of the spectacle glass are fabricated, especially by grinding, such that they form at least one optical focus by convex and concave shaping. The determination of the focus of a spectacle glass is done according to a vision defect of a person that will ideally be corrected by means of the spectacle glass. In particular, the natural focus of the eye will be corrected by the spectacle glass.

It may be necessary for an age-related vision correction that the spectacle glass have several focal points. The lens of the eye is curved to differing extent, depending on the distance from the object. With aging vision, this elasticity is limited—the lens of the eye becomes hard and thick. This means that the vision defect of the eye for objects at short distance from the eye (near vision range) is different from that for far removed objects (far vision range). In order to see objects clearly at all distances, the focal point of the eye must be corrected by a particular focal point of a spectacle glass depending on the distance of the object from the eye. An obvious and classical solution is to switch to a spectacle glass with a different focal point depending on the distance of the object from the eye. However, it is also possible to design a spectacle glass so that it has several focal points in different zones. Thanks to such a design it is possible to refrain from switching the spectacle glass and instead switch the zone of the spectacle glass by changing the direction of looking.

If a spectacle glass has two different focal points, generally one for the far vision range and one for the near vision range in the lower region of the spectacle glass, this is known as a bifocal spectacle glass. Such glasses are recognizable mostly on account of a visible transition between the two regions. If the focal point differs repeatedly upon changing the angle of looking, especially from top to bottom, one has a multifocal spectacle glass. The focal point can also change continuously.

Various methods are used to manufacture spectacle glasses. In the most simple case, a spectacle glass is made from a flat blank in several work steps. This blank is a level disk of silicate glass or plastic. At first, in this method, the desired geometries of the optical surfaces are produced on both sides of the blank by mechanical working (lathe work, milling, grinding). The surfaces produced after this step have great surface roughness and are optically nontransparent. Therefore, the machining step is followed by a polishing step. The roughness of the surfaces is reduced so much that light is no longer scattered unacceptably and the lens is thus transparent. In addition, the outer contour of the spectacle glass is produced by machining the outer contour of the blank.

Economical standard spectacles today generally have standardized lenses. At first, round circular blanks are made by casting or injection molding. The quality of such blank surfaces is so high that no further machining of the surface is necessary. Only the contour needs to be adapted to a predetermined spectacle frame. Such spectacle glasses generally have both a spherical front side and a spherical back side. By spherical is meant that the surface is a cutout from a sphere, or that all points on a surface lie at a distance of the radius R from a midpoint M of the sphere. Such standardized spectacle glasses, though extremely economical to purchase, usually do not meet the desires for visual acuity in the near and far zone, and across the entire viewing angle from top to bottom and from left to right.

To reduce these quality defects, more expensive spectacle glasses are usually individualized by surveying the eyes and calculating how a spectacle glass has to be constructed in order to optimally correct an existing vision defect. The outcome of the calculation is usually documented by an optician or eye doctor and provided in the form of a prescription to the person who will fabricate the spectacle glass from a blank. Therefore, in the following we shall refer to a blank individualized by prescription as a prescription lens. From the prescription lens, the spectacle glass is then produced by machining the outer contour.

Various methods are considered for making of prescription lenses. For economic reasons, methods are especially adopted that individually finish a blank produced in a large series by cutting methods and polishing. Blanks of plastic are generally created by casting or injection molding, and blanks of silicate glass by lowering, deepening, or drawing down heated glass rounds into shapes. The quality of such blank surfaces, especially the front and back side, is so high that basically no further machining of the surface is needed. However, such a blank has one or more standardized focal points that often do not optimally correct the vision defect of a particular eye. Therefore, the blank or partial regions of it, such as only one side, are individually adapted by finishing to the vision defect of a particular eye. For this, a removal of material is calculated to configure the prescription lens, based on the front-side and back-side surfaces of the blank and a prescription. The parameters of the surface geometry of the blank are essential for this calculation. After this, a finishing can be done on the front and back side or only on one side. A one-sided finishing generally causes lower production costs than a two-sided one, since the finishing labor is lower. If one side is individualized by finishing, we have a so-called prescription surface.

The finishing is done today with modern CNC milling machines, so that even complicated surface configurations can be realized. However, the finishing of a blank is limited in that both the stability of the lens must be preserved, and the radii of curvature and the material thickness of the blank set limits to the changes. Therefore, at least a certain number of different blanks are needed to manufacture spectacle glasses for the largest possible range of vision defects. Spectacle glasses for rare and extremely large vision defects that do not fall in this range have to be manufactured by different production methods, for example, by manufacture from a cube of material.

A manufacture of individualized spectacle glasses from blanks is described, among other things, in EP 0744 646 A1. Various round blanks are used, one side surface of which has already been prepared. These are made by a casting or injection molding process. The front side of the blank in this case is convex and spherical. The prescription surface is calculated on the basis of a prescription provided by an eye doctor and then manufactured by cutting and polishing. It can be spherical, toroidal or multifocal. The desired optical properties of the spectacle glass result ultimately from combinations of the standardized spherical front side and the prescription side and correspond to the given prescription. Finally, the contour of the prescription lens is adapted to the geometry of a selected spectacle frame.

DE 197 01 312 A1 also describes a manufacturing of individualized spectacle glasses. Here, a blank is finished only on the back side. This means that the prescription surface lies on the back side of the blank. The front side, on the contrary, remains unchanged and it is spherical or aspherical. An aspherical surface is characterized in that it can be described by a mathematical function per DIN ISO 10110-12. The radius here varies continuously from a central axis to the outside. The back side of the spectacle glass is calculated by prescription as a multifocal freeform surface and produced by finish machining. Finally, the contour of the prescription lens is adapted to the geometry of a chosen spectacle frame.

DE 101 03 113 A1 likewise describes a rotationally symmetrical and especially a spherical front side of a round blank, but without further configuring it.

However, considerable drawbacks result from a prescription manufacturing according to EP 0744 646 A1, DE 197 01 312 A1 and DE 101 03 113 A1 with certain spectacle frames. Especially modern narrow spectacle glasses occupy only a small part of the blank surface. Thus, a large waste occurs in the manufacturing. Although such spectacle glasses are small, the production costs therefore correspond to those of larger glasses. Furthermore, in order to manufacture two spectacle glasses, a blank has to be placed twice in a CNC machine, which takes time to do, and causes expense.

General Description

The problem of the disclosure is to boost the economic efficiency in the manufacture of spectacle glasses. In particular, the waste and the labor expense for this should be reduced. One must allow for the existence of fashion requirements for the geometry of the front side. Ideally, the number of different blanks should be limited, so as to keep low the owning costs. The other drawbacks of the prior art should also be eliminated.

The disclosure concerns a method for manufacture of spectacle glasses from prefabricated blanks made without cutting, consisting preferably of plastic or silicate glass, with a front side not to be finished and an opposite back side to be finished by a CNC machine, having at least one optical focus in common, wherein for the finishing of the back side one calculates a prescription surface on the basis of a prescription of a person, describing the vision defects of a left and a right eye, such that the machined back side together with the front side forms a first prescription lens and a second prescription lens, and from these one makes two spectacle glasses, and wherein the focal points of the first spectacle glass correct the vision defect of the left eye and the focal points of the second spectacle glass correct the vision defect of the right eye of the person.

Thus, the spectacle glasses have an optical center through which the wearer of the spectacles looks straight ahead (zero viewing direction) that does not coincide with the center axis of the blank.

Blanks of plastic could be made by casting or injection molding and blanks of silicate glass by lowering, deepening, or drawing down heated glass rounds into shapes. The quality of the blank surface should be so high that basically no further finishing of the front and back side is needed. In this way, the blank can be adapted to a spectacle frame even without finishing of the front and back side and used by a person with a vision defect for correction thereof.

A prescription is any source of information about a vision defect. It need not be a written document from a doctor or optician. Based on the front-side and back-side surfaces of the blank, one can calculate the material removal to produce the prescription surface. The parameters of the surface geometry of the front side and back side of the blank are essential for this calculation. After this, a finishing of the back side can be done for the prescription surface. Such a one-sided finishing generally causes lower production costs than a two-sided one.

The finishing of the back side is done with modern CNC machines. At first, the prescription surface is made by mechanical working (lathe work, milling, grinding). Since such a surface generally has too great a surface roughness, it is optically nontransparent. Therefore, the cutting is followed by a polishing step. The roughness of the surfaces is reduced so much that light is no longer scattered unacceptably and the lens thus becomes transparent.

After the machining of the back side to a prescription surface, only the contour of the two prescription lenses now present in the machined blank need to be adapted to a given spectacle frame. However, this step could also be done before or during the machining of the back side.

Since two spectacle glasses are made from one blank, the blank according to the invention contributes to lower storage and transport costs, and also protects the environment due to less waste. In particular, spectacle glass geometries that previously extended over only a small region of a blank and caused high waste can now be manufactured quickly and economically, since only one blank needs to be placed in the CNC machine and a larger portion of the blank is utilized.

The front side of the blank is preferably configured to be spherical, aspherical, or a convex and rotationally symmetrical first freeform surface, which is composed of at least two spherical segments of different radius outwardly from a central axis, and the spherical segments border on each other tangentially in a spherical transition.

A spherical configuration requires slight computational expense. Furthermore, the spectacle glasses can be positioned arbitrarily on the blank, without their geometry changing, especially that of the front side. On the other hand, the geometry of an aspherical front side corresponds more to the esthetic wishes of the spectacle user.

In a freeform surface, the tangents of the adjoining spheres are equal at the point where they touch each other. Thus, there are no breaks on the front side and each point on the front side is mathematically differentiable. That means that each point on the front side has only one plane-normal vector. One will start with a macroscopic and not a microscopic surface. Thanks to the rotational symmetry, the midpoint of the sphere that is closest to the central axis will lie on the central axis.

The number of spheres jointly forming the front side can be chosen arbitrarily, so that even progressive lenses can be produced. The rotational symmetry can be preserved for any given number of spheres.

Because adjoining spheres are arranged tangentially to each other at a sphere transition, a harmonic transition between two spheres is ensured, which is experienced as being comfortable by the user of the vision aid. Furthermore, this also has esthetic advantages, since there are consequently no edges on the front side of a spectacle glass manufactured in this way where light could be abruptly refracted in different ways. On the whole, the spectacle glass also takes on a dynamic-sporty character thanks to the arrangement of the spheres. Such a spectacle glass gives a harmonic impression to outside observers.

Furthermore, the back side of the blank according to one embodiment of the method is configured to be spherical, aspherical, or a concave and rotationally symmetrical second freeform surface, which is composed of at least two spherical segments of different radius outwardly from a central axis, and the spherical segments border on each other tangentially in a spherical transition.

The back side should be designed for the front side so that the geometry of the blank is as close as possible to the end result of the prescription lens. In this way, the finishing expense is reduced, since a smaller removal of material is needed. As a result, minimal manufacturing costs are achieved and there is maximum protection of the environment.

Preferably, a spherical segment situated closer to the central axis has a larger radius than a spherical segment more remote from the central axis.

In such a freeform surface, the curvature of the blank increases with increasing distance from the central axis. This has benefits in terms of esthetics and one can also reduce blurring in the edge region so that no convex or flat regions are needed in the prescription surface corresponding to the front side.

In this way, the prescription surface can be essentially configured such that the user looks at it as perpendicularly as possible in every viewing angle. Ideally, the plane-normal vectors of the prescription surface lie on an axis with it in every viewing direction. Accordingly, the user would always be looking perpendicularly to the glass surface. However, the prescription surface is based primarily on the prescription data. Yet in order to still fulfill the requirement of the perpendicular viewing angle, the front side must already be configured such that the corresponding back side achieves this requirement. The arrangement of several spheres on the front side helps in this, and at the same time the front side need not be shaped such that it no longer fulfills the requirements of esthetics.

A special variant of the method call for the blank being configured such that it consists of two segments alongside each other.

In this way, for example, two rectangular segments from rotationally symmetrical blanks can be assembled into a rectangular blank. One spectacle glass can now be made from each segment. In particular, with angular spectacle glasses, a major portion of the waste can thus be avoided and there are lower material and logistical costs. Furthermore, only one blank needs to be placed in the CNC machine to make two spectacle glasses, so that the manufacturing costs are low.

Preferably, the cutout is formed from a rotationally symmetrical spherical, aspherical or freeform blank so that it is the outer geometry of a spectacle glass plus a machining excess. In this way, a minimum size of the blank is achieved for two spectacle glasses. One only needs to provide the excesses needed for the machining, for example, between the two spectacle glasses, so that they can be separated from each other.

According to one embodiment of the method, the blank has a round circular or an angular outer contour. The blanks are generally circular. The outer edge of the blanks, however, can also be a segment of a circular blank that has a shape differing from a circle. The outer blank is immaterial; what is important is whether a noncircular blank can be obtained from one or more segments of a rotationally symmetrical blank. For example, a quadrangular shape of the blanks could be advantageous if most glasses sold are likewise quadrangular on account of a fashion trend. This would reduce the waste resulting from the adapting of the rough or prescription lens to the spectacle frame.

The disclosure can provide that the front side and the prescription surface be configured such that after the fabrication of the two spectacle glasses they together form at least two bifocal spectacle glasses, but preferably two multifocal spectacle glasses.

Multifocal spectacle glasses are in rather large demand by eyeglass users today. This is due mainly to better viewing comfort with no hard transition, enabling improved correction of the vision defect at different distances from objects to the eye. However, for tasks in which two distinct distances from the eye occur, spectacles with bifocal glasses are also often still worn.

Advantageously, several different blanks are made having different curvatures on the front side and the back side, while the front side and the back side form at least one focal point that can only be changed to a limited extent by a finishing of the back side to form a prescription surface, and the curvatures of the different blanks are staggered such that suitably staggered blanks are available for all typical spectacle glasses.

However, it must be considered that although the machining time to produce the prescription lenses decreases with increasing number of different blanks, the warehousing and logistical costs also increase. Thanks to the different blanks, one can offer economical spectacle glasses for a broad range of vision defects, and with high quality in terms of esthetics and functionality.

The staggering of the blanks could be designed so that the finishing time for the back side is minimized in that the material removal is slight when manufacturing the prescription surface. Thanks to the lower finishing time, the production costs of the spectacle glasses are reduced.

The two spectacle glasses are preferably cut out from the two prescription lenses by a water jet or laser method or by cutting, especially milling.

The tool used must be able to work between the two spectacle glasses. The more closely the two glasses are arranged to each other, the more fine the separation must be, so that the spectacle glasses are not damaged. Classical milling cutters have a minimum diameter of the milling head that requires a somewhat greater distance between the spectacle glasses. It is beneficial to the milling process that such tools be regularly available. Water jet or laser methods can produce narrower cuts and they are faster. However, the lower manufacturing costs for the spectacle glasses in this case are offset by a larger investment in the machines. It is advantageous to choose a method that produces the least costs for the spectacle glasses manufactured per year.

A small machining excess can be left on the spectacle glass in the cutout process. If the edges have to be finished, such an excess should be provided. In this way, the geometry can be fitted precisely to a particular spectacle frame and the quality of the edges can be enhanced.

For this, the machining excess should be finished by grinding and polishing. Grinding will at first produce the final geometry, before polishing is done to create a light transparency even at the edges. This has esthetic benefits in particular, which are especially significant with rimless spectacle frames.

According to the disclosure, a mirror-image and thus optically harmonic front side of two spectacle glasses can be produced in having the two upper edges or the two lower edges of the spectacle glasses neighboring each other prior to the fabrication from the prescription lenses. Esthetically symmetrical spectacles glasses can be produced in this way, especially from blanks whose front side is more curved with increasing distance from the central axis. The edges situated closer to the central axis are less greatly curved. Therefore, for esthetic reasons, a neighboring arrangement of the upper edges is usually preferable.

To make the spectacle glasses, the blank can be fixed in a tool holder such that the spectacle glasses are fixed to the tool holder after being manufactured from the prescription lenses. This means that a fixation is done in the region of the surface of the front side that later will belong to a spectacle glass. The two spectacle glasses are being separated are thus still fixed to the tool holder and are not damaged by any uncontrolled movement. Furthermore, the further work steps such as a polishing of the back side and the edges can be directly continued.

Moreover, the tool holder surface could be configured so that it is a negative image of the front side of a blank. In this way, the blank of the invention would be ideally supported during the making of the spectacle glasses.

It would also be possible to have the tool holder be divisible so that, after the separation, the two spectacle glasses can be further worked independently of each other. This improves the machining accessibility for tools, especially when working the edges.

BRIEF DESCRIPTION OF THE DRAWINGS

Additional features, details and benefits of the invention will emerge from the wording of the claims, as well as the following specification of sample embodiments based on the drawings. There are shown:

DETAILED DESCRIPTION OF THE DRAWINGS

Figure 1:
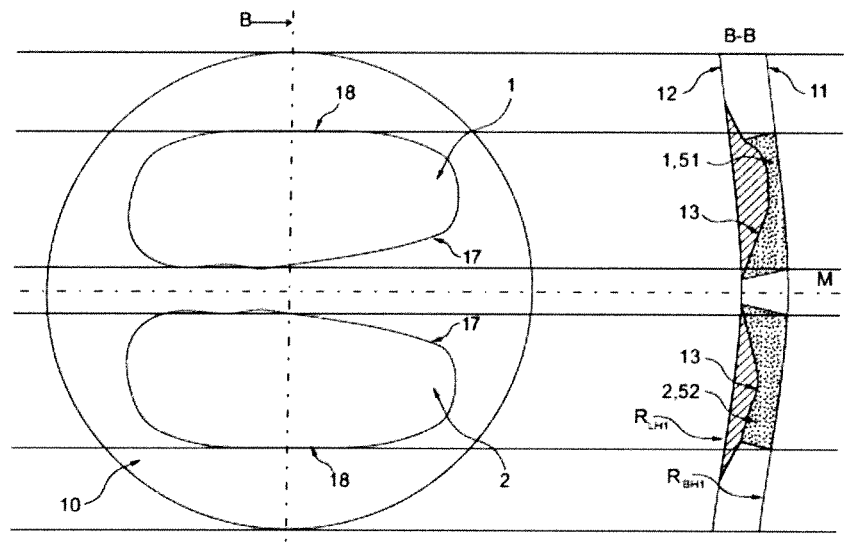
FIG. 1, a blank with a spherical front and back side with arranged spectacle glasses.

FIG. 1 shows a round blank 10 for a method according to the invention for the manufacturing of spectacle glasses 1, 2. This can consist of plastic or silicate glass. In the blank 10, a first spectacle glass 1 and a second spectacle glass 2 are arranged so that their upper edges 17 are neighboring each other. Thus, they are arranged closer to a central axis M of the blank 10 than the lower edges 18 of the spectacle glasses 1, 2.

From section B-B one sees that the blank 10 has a front side 11 with a radius $R_{BH1}$ and a back side with a radius $R_{LH1}$. The back side 12 is further machined by cutting with a CNC machine so that a prescription surface 13 is produced, corresponding to a prescription-based calculation of the first spectacle glass 1 and the second spectacle glass 2. Thus, a first prescription lens 51 and a second prescription lens 52 are then arranged in the machined blank 10. After this, the first spectacle glass 1 can be separated from the region of the first prescription lens 51 and the second spectacle glass 2 from the region of the second prescription lens 52. Before or after the separating, the prescription surface 13 can be polished so that it is optically transparent. The focal points of the first spectacle glass 1 can now correct the vision defect of the left eye and the focal points of the second spectacle glass 2 the vision defects of the right eye of the prescription user.

Figure 2:
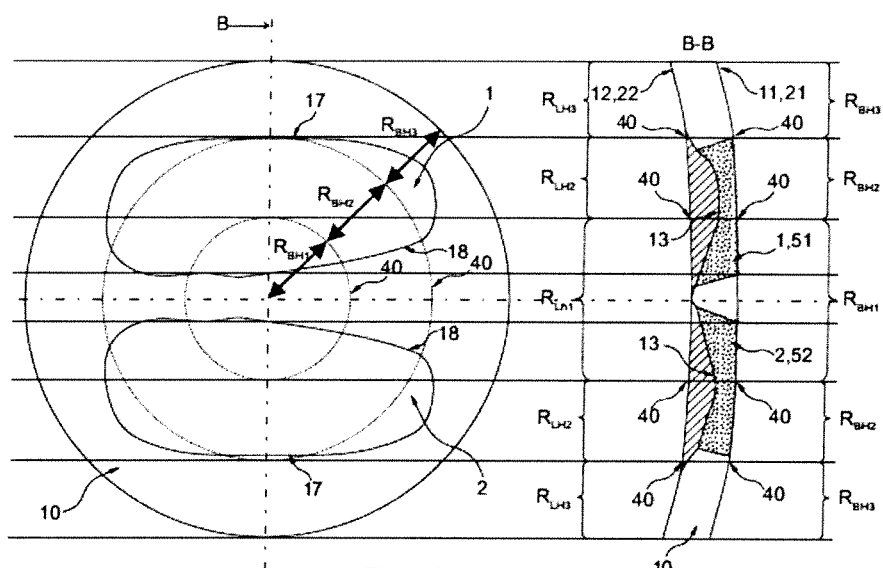
FIG. 2, a blank with a free-formed front and back side with arranged spectacle glasses, wherein the front and back side consist of tangentially bordering spheres.

FIG. 2 likewise shows a round blank 10 for a method according to the disclosure for manufacture of spectacle glasses. This can consist of plastic or silicate glass. In the blank 10, a first spectacle glass 1 and a second spectacle glass 2 are arranged so that their lower edges 18 are neighboring each other. Thus, they are arranged closer to a central axis M of the blank 10 than the upper edges 17 of the spectacle glasses 1, 2.

From section B-B one sees that the blank 10 has a front side 11 with a first freeform surface 21 and a back side with a second freeform surface 22. The first freeform surface 21 consists of three spherical sections of different radii $R_{BH1}$, $R_{BH2}$, $R_{BH3}$ that are arranged with rotational symmetry about the central axis M. These spherical sections bound each other tangentially in spherical transitions 40. The second freeform surface 22 also consists of three spherical sections of different radii $R_{LH1}$, $R_{LH2}$, $R_{LH3}$ that are arranged with rotational symmetry about the central axis M and that bound each other tangentially in spherical transitions 40. The spherical sections arranged closer to the central axis M have a larger radius than a spherical section further removed from the central axis M. That is: $R_{BH1} > R_{BH2} > R_{BH3}$ and $R_{LH1} > R_{LH2} > R_{LH3}$.

The back side 12 can further be machined by cutting with a CNC machine so that a prescription surface 13 can be produced, corresponding to a prescription-based calculation of the first spectacle glass 1 and the second spectacle glass 2. Thus, a first prescription lens 51 and a second prescription lens 52 are then arranged in the machined blank 10. After this, the first spectacle glass 1 could be separated from the region of the first prescription lens 51 and the second spectacle glass 2 from the region of the second prescription lens 52. The focal points of the first spectacle glass 1 then correct the vision defect of the left eye and the focal points of the second spectacle glass 2 the vision defects of the right eye of the prescription user.

Figure 3:
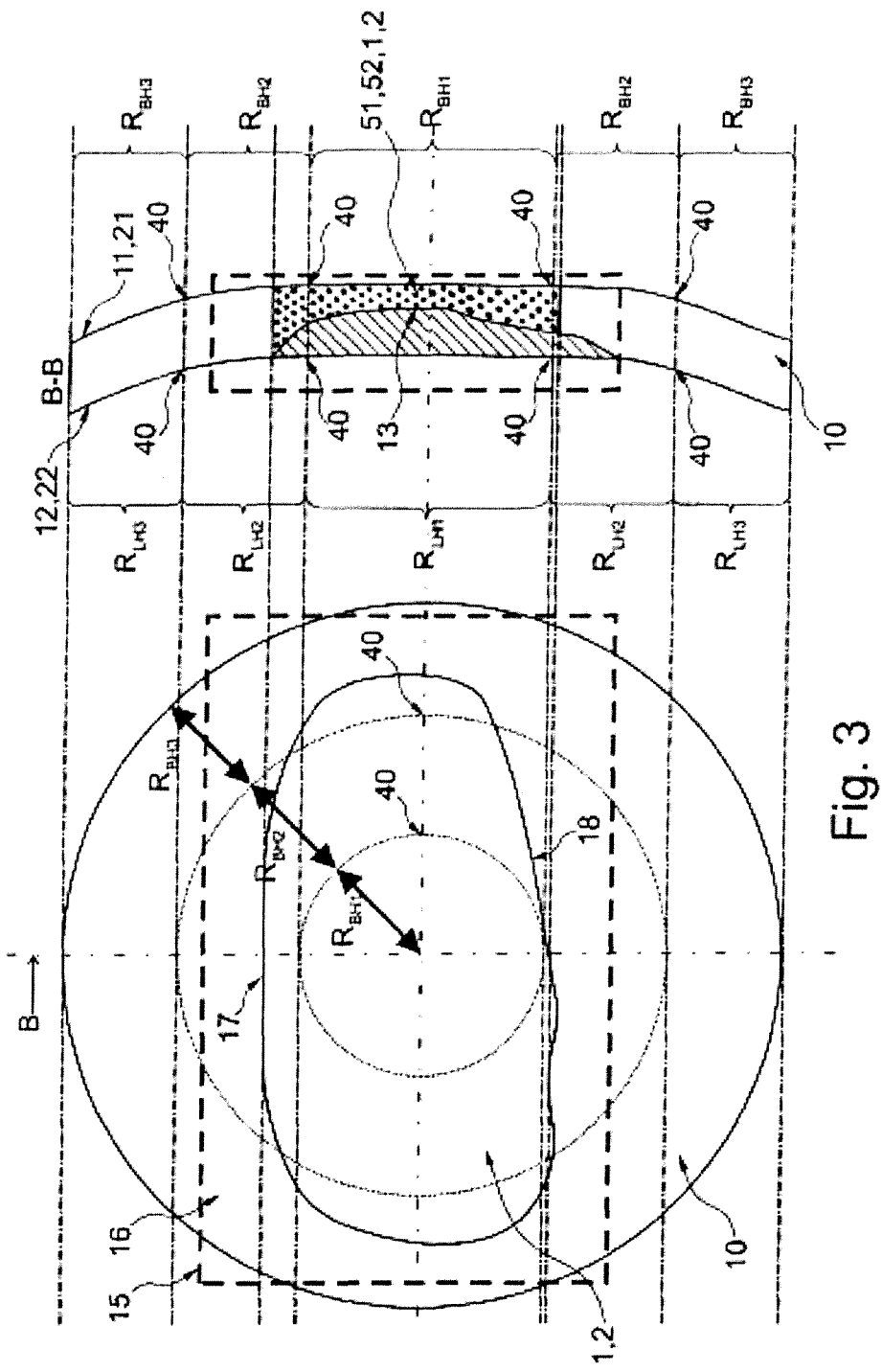
FIG. 3, the starting situation for the forming of a cutout from a round blank.

FIG. 3 shows a round blank 10 for a method according to the disclosure for manufacture of spectacle glasses. This can consist of plastic or silicate glass. In the blank 10, a first spectacle glass 1 and a second spectacle glass 2 are arranged. A central axis M of the blank 10 lies between an upper edge 17 and the lower edge 18 of the spectacle glasses 1, 2.

From section B-B one sees that the blank 10 has a front side 11 with a first freeform surface 21 and a back side with a second freeform surface 22. The first freeform surface 21 consists of three spherical sections of different radii $R_{BH1}$, $R_{BH2}$, $R_{BH3}$ that are arranged with rotational symmetry about the central axis M. These spherical sections bound each other tangentially in spherical transitions 40. The second freeform surface 22 also consists of three spherical sections of different radii $R_{LH1}$, $R_{LH2}$, $R_{LH3}$ that are arranged with rotational symmetry about the central axis M and that bound each other tangentially in spherical transitions 40. The spherical sections arranged closer to the central axis M have a larger radius than a spherical section further removed from the central axis M. That is: $R_{BH1} > R_{BH2} > R_{BH3}$ and $R_{LH1} > R_{LH2} > R_{LH3}$.

The back side 12 can further be machined by cutting with a CNC machine so that a prescription surface 13 can be produced, corresponding to a prescription-based calculation of the first spectacle glass 1 or the second spectacle glass 2. Thus, a first prescription lens 51 or a second prescription lens 52 is then arranged in the machined blank 10. After this, the first spectacle glass 1 could be separated from the region of the first prescription lens 51 or the second spectacle glass 2 from the region of the second prescription lens 52. The focal points of the first spectacle glass 1 can now correct the vision defect of the left eye or the focal points of the second spectacle glass 2 the vision defect of the right eye of the prescription user.

This arrangement serves at first to determine a cutout 15 to form a blank 10. The external geometry of the cutout 15 is rectangular and comprises the spectacle glass 1, 2, plus a machining excess 16. Excesses of the blank 10 that go beyond the external geometry of the cutout 15 are not taken into account when forming a blank 10.

Figure 4:
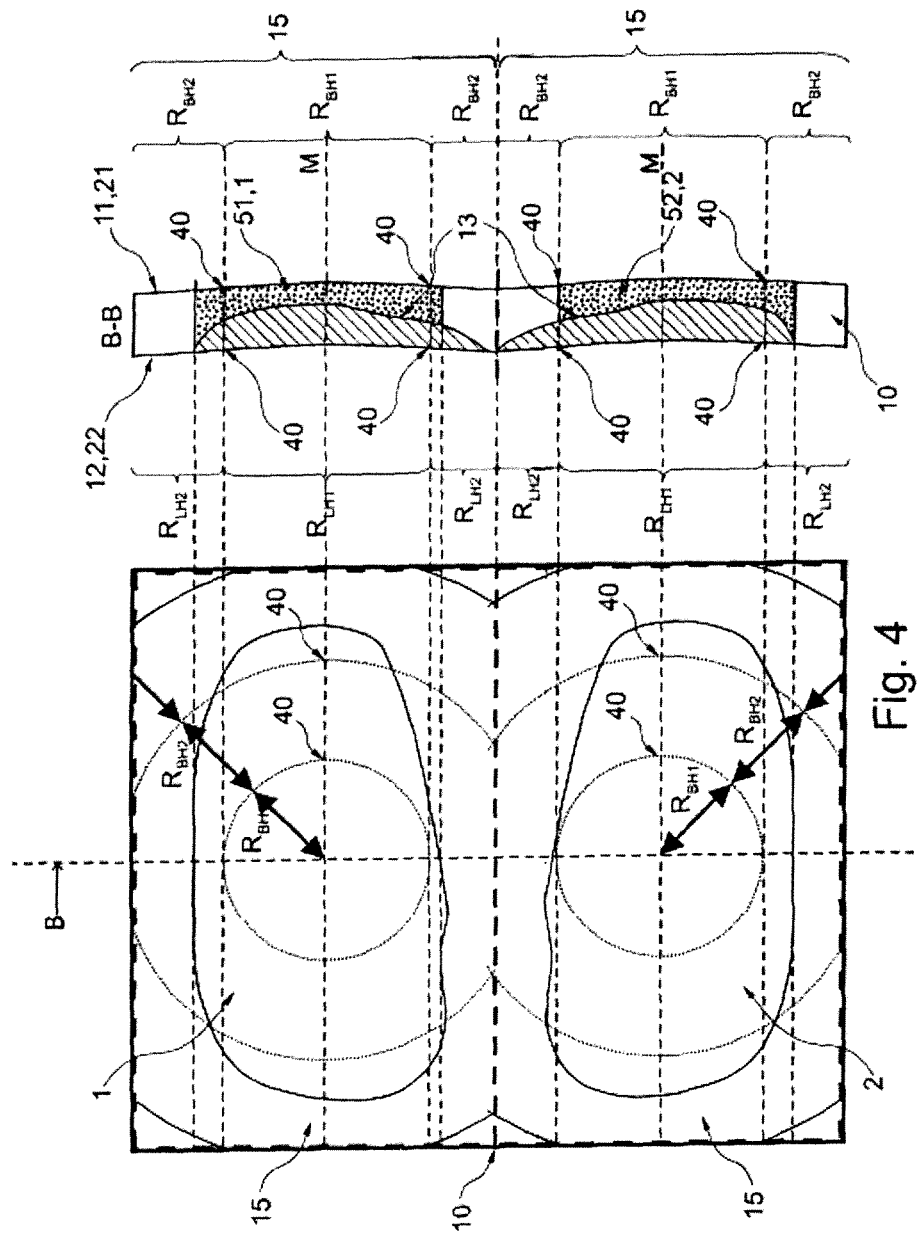
FIG. 4, a blank consisting of two cutouts.

FIG. 4 shows a one-piece rectangular blank 10 according to the disclosure, containing two cutouts 15. The blank 10 can consist of plastic or silicate glass and a first spectacle glass 1 and a second spectacle glass 2 are arranged in it.

From the drawing one can see that the cutouts 15 each have a front side 11 with a first freeform surface 21 and a back side 12 with a second freeform surface 22. The first freeform surfaces each consist of three spherical sections of different radii $R_{BH1}$, $R_{BH2}$, $R_{BH3}$ that are arranged with rotational symmetry about the central axis M. These spherical sections bound each other tangentially in spherical transitions 40. The second freeform surfaces 22 also each consist of three spherical sections of different radii $R_{LH1}$, $R_{LH2}$, $R_{LH3}$ that are arranged with rotational symmetry about the central axis M and that bound each other tangentially in spherical transitions 40. The spherical sections arranged closer to the central axis M have a larger radius than a spherical section further removed from the central axis M. That is: $R_{BH1} > R_{BH2} > R_{BH3}$ and $R_{LH1} > R_{LH2} > R_{LH3}$. At the boundary between the two cutouts 15 a radius can be provided on the front side 11 and/or the back side 12, avoiding a sharp kink in the surface. In this way, a refraction of the blank 10 can be prevented.

The back side 12 is further machined with a CNC machine to remove material, so that a prescription surface 13 is produced, corresponding to a calculation by means of a prescription of the first spectacle glass 1 and the second spectacle glass 2. Thus, a first prescription lens 51 and a second prescription lens 52 is then arranged in the machined blank 10. After this, the first spectacle glass 1 can be separated from the region of the first prescription lens 51 and the second spectacle glass 2 from the region of the second prescription lens 52. The focal points of the first spectacle glass 1 can now correct the vision defect of the left eye or the focal points of the second spectacle glass 2 the vision defect of the right eye of the prescription user.

The invention is not limited to the above-described embodiments, but rather can be modified in various ways.

All features and benefits emerging from the claims, the specification, and the drawing, including design details, spatial arrangements, and steps of the method, can be essential to the invention both in themselves and in the most diverse combinations.

The invention claimed is:

1. Method for manufacturing spectacle glasses, comprising:

prefabricating a blank without cutting, the prefabricated blank having a front side not to be finished and an opposite back side, the front side and the back side of the prefabricated blank having at least one optical focus in common;

finishing the back side of the prefabricated blank with a CNC machine, wherein the finishing comprises calculating a prescription surface on the basis of a prescription of a person, the prescription describing the vision defects of a left and a right eye of the person, and machining the back side to the prescription surface, such that after the machining, the machined back side and the front side of the prefabricated blank together form a first prescription lens and a second prescription lens within the prefabricated blank, wherein the first and second prescription lenses each comprise an upper edge and a lower edge, and wherein the upper edges or the lower edges are arranged closer to each other, within the prefabricated blank, than the other of the upper edges and the lower edges; and making first and second spectacle glasses by separating the first prescription lens from the second prescription lens, respectively, and by adapting a contour of the first prescription lens and the second prescription lens to a given spectacle frame, wherein focal points of the first spectacle glass correct the vision defect of the left eye of the person and focal points of the second spectacle glass correct the vision defect of the right eye of the person.

2. The method according to claim 1, wherein the front side of the prefabricated blank is configured to be spherical, aspherical, or a convex and rotationally symmetrical first freeform surface, the first freeform surface comprising at least two spherical segments of different radius outwardly from a central axis, and the spherical segments border on each other tangentially in a spherical transition.

3. The method according to claim 1, wherein the back side of the prefabricated blank is configured to be spherical, aspherical, or a concave and rotationally symmetrical second freeform surface, the second freeform surface comprising at least two spherical segments of different radius outwardly from a central axis, and the spherical segments border on each other tangentially in a spherical transition.

4. The method according to claim 2, wherein a spherical segment situated closer to the central axis has a larger radius than a spherical segment more remote from the central axis.

5. The method according to claim 1, wherein the blank has a circular or an angular outer contour.

6. The method according to claim 1, wherein making first and second spectacle glasses comprises making two bifocal spectacle glasses.

7. The method according to claim 1, wherein making the first and second spectacle glasses further comprises cutting the first and second spectacle glasses out from the first and second prescription lenses by a water jet, using a laser, or by cutting.

8. The method according to claim 7, wherein the cutting comprises leaving a small machining excess on the first and second spectacle glasses.

9. The method according to claim 8, wherein the machining excess is finished by grinding and polishing.

10. The method according to claim 1, wherein the upper edges of the first and second spectacle glasses or the lower edges of the first and second spectacle glasses are arranged adjacent to each other prior to the making act.

11. The method according to claim 1, further comprising fixing the blank in a tool holder such that the first and second spectacle glasses are fixed to the tool holder after being made from the first and second prescription lenses.

12. The method according to claim 6, wherein making first and second spectacle glasses comprises making first and second multifocal spectacle glasses.

13. The method according to claim 7, wherein the first and second spectacle glasses are cut out by milling.

* * * * *